United States Patent
Cyphers

[15] 3,656,382
[45] Apr. 18, 1972

[54] RUBBER OR PLASTIC FEEDER-CUTTER

[72] Inventor: Charles A. Cyphers, Mt. Gilead, Ohio
[73] Assignee: Sund-Borg Machines Corporation, Tremont, Ohio
[22] Filed: Aug. 28, 1970
[21] Appl. No.: 67,721

[52] U.S. Cl.....................83/150, 83/161, 83/355, 83/408, 83/430, 83/519, 83/566, 83/672, 83/673, 83/906
[51] Int. Cl..........................................B26d 9/00
[58] Field of Search..............83/355, 594, 596, 906, 408, 83/430, 519, 672, 675, 663, 665, 595, 150, 158, 161; 241/246, 247, 248, 276; 146/184, 186, 79; 18/2 J, 12 TS

[56] References Cited

UNITED STATES PATENTS

| | | | |
|---|---|---|---|
| 1,909,029 | 5/1933 | Walter | 83/672 X |
| 2,468,613 | 4/1949 | Bjorklund | 146/184 |
| 3,102,694 | 9/1963 | Frenkel | 241/276 X |
| 3,164,862 | 1/1965 | Zies | 83/355 X |

*Primary Examiner*—Frank T. Yost
*Attorney*—Roy E. Raney, Linx J. Raney, Henry W. Collins, David A. Buage and Watts, Hoffmann, Fisher & Heinke

[57] ABSTRACT

Apparatus for cutting strips or rope-like lengths of material, especially rubber, or rubber-like plastic material, or plastic having a rubber like consistency, into discrete, shorter lengths for subsequent working.

6 Claims, 6 Drawing Figures

INVENTOR
Charles A. Cyphers
BY
Aubrey L. Burgen
ATTORNEY

INVENTOR
Charles A. Cyphers
BY
ATTORNEY

RUBBER OR PLASTIC FEEDER-CUTTER

BACKGROUND OF THE INVENTION

Apparatus is known for cutting discrete lengths of material from longer lengths. Generally such devices are of the reciprocating guillotine type in which a vertically moving blade severs lengths of material, or of the type described in the U. S. Pat. to Caste, No. 2,739,647, in which a rotating member with spaced cutting blades severs discrete lengths of material from that which is fed to a cutting station. In each type, means, such as opposed rolls, are used to feed the material to the cutting or severing location. Generally such prior art devices do not operate satisfactorily with gummy material, are rather noisy, and require frequent maintenance.

Another known device feeds a strip or rope into the void of an extruder screw which propels the material into the screw tube or barrel. This requires considerable power because the strip is sheared between the screw flights and the inner wall of the barrel.

THE INVENTION

According to this invention, there is provided apparatus for cutting strips or rope-like lengths of material, especially plastic material, into discrete lengths, the apparatus comprising an elongated housing having a bore therethrough with a rotating auger therein. The auger closes one end of the bore; the open end of the bore is for the discharge of the cut or several lengths of material. The auger has a cutting portion and a conveying portion, the portions having different screw pitches. The cutting portion is positioned adjacent a feed opening, the feed opening and wall of the bore defining a cutting edge against which the cutting portion of the auger forces the material, from which the discrete lengths are severed. The cut or severed lengths drop into the bore and are conveyed therefrom by the auger.

To feed material to the feed opening, a pair of cooperating, knurled feedrolls is used. Circular knives may be incorporated or associated with the rolls to sever the strip material into rope-like sections. The knives, if used, overlap one another, so as to be self-sharpening, but do not ride on or contact the adjacent cooperating feed roll.

This arrangement permits the cutting of rather gummy plastics without difficulty.

THE DRAWINGS

DETAILED DESCRIPTION

Figure 1:
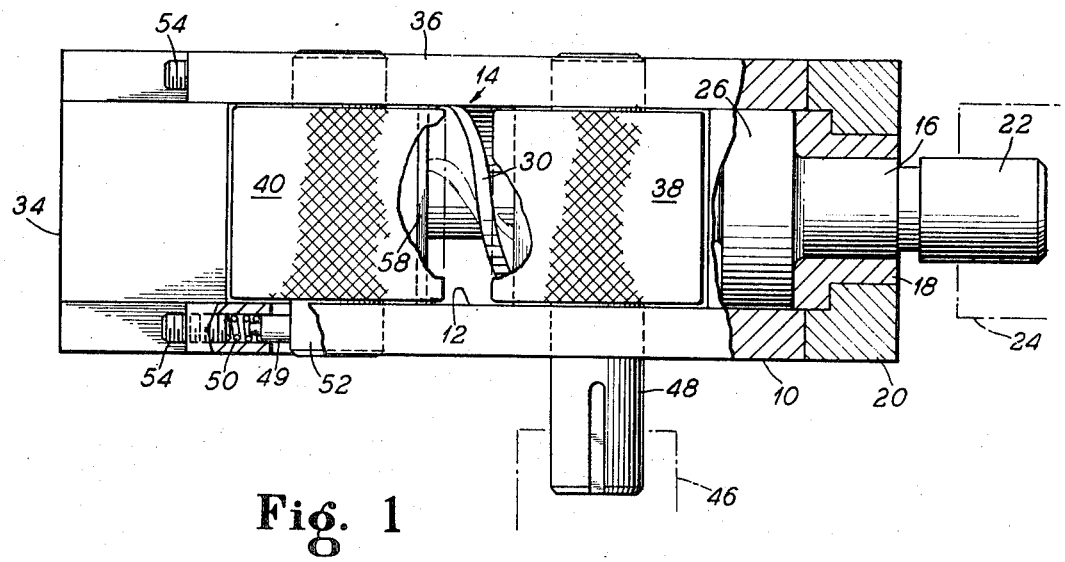
FIG. 1 is a top plan view with parts broken away to show details of one embodiment of the invention in which a pair of feed rolls feeds strip material to be severed into discrete lengths.
Figure 2:
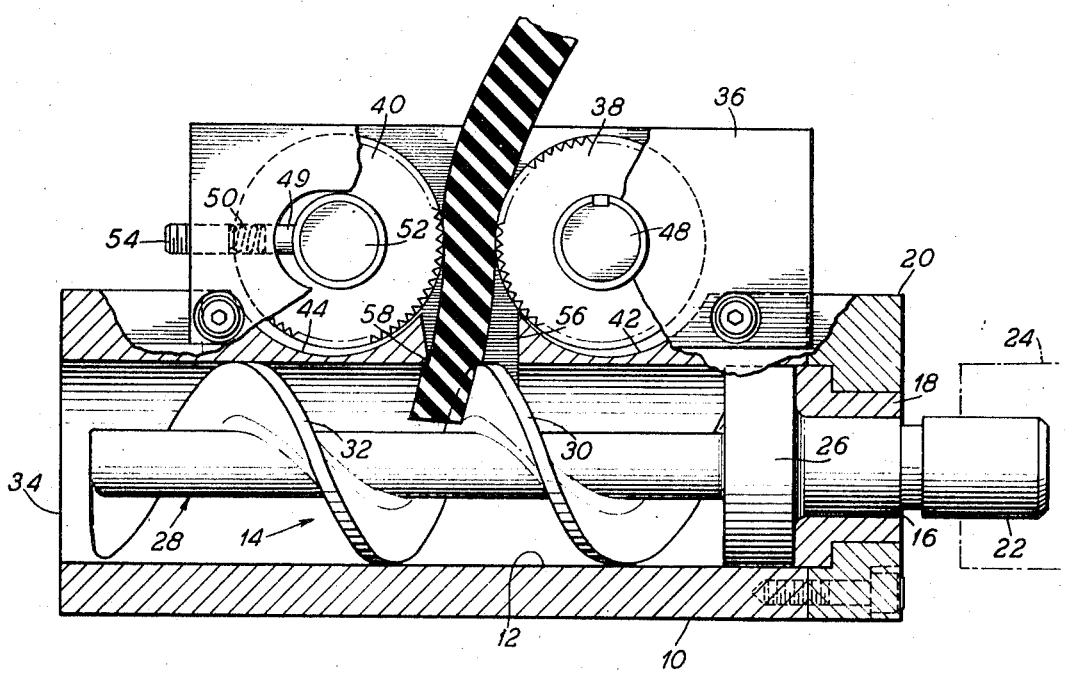
FIG. 2 is a side elevational view of the structure of FIG. 1 with parts broken away to show details.
Figure 3:
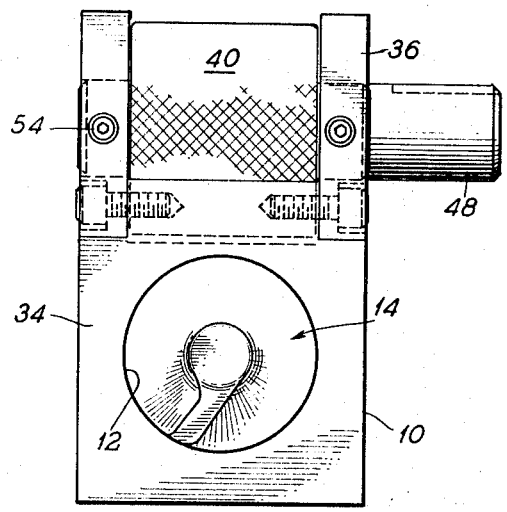
FIG. 3 is an outlet end view of the structure illustrated in FIGS. 1 and 2.

Looking at FIGS. 1, 2 and 3 there is illustrated an apparatus constructed according to this invention which comprises a housing 10 having a bore 12 therethrough in which a rotating auger member 14 is disposed. The auger 14 has an axially extending shaft 16 journalled in end thrust bearing 18 held in assembled relationship to the housing by an end and journal member 20, bolted or otherwise secured to the housing 10. The auger 14 is provided with a shaft portion 22 for connection to a driving means 24, which is schematically shown.

The auger 14 has a cylindrical portion 26 and an axially extending auger portion generally identified as 28. The auger portion is subdivided into a cutting portion 30 and a conveying portion 32. The prime difference between the cutting and conveying portions of the auger is the difference in angle and pitch of the flights as can be easily observed, especially from FIG. 2. The bore 12 is open at its end 34 for the discharge of material.

A secondary housing 36 is connected to the housing 10 and contains a pair of opposed, preferably knurled, feed rolls 38, 40. The housing 10 is cut, as at 42, 44 to accommodate the rolls, one of which, the roll 38, is driven by a driving means schematically shown at 46 by an axial shaft 48. The roll 40 is an idler roll, driven by the frictional contact with the material fed thereto. To adjust the position the idler roll 40 and to bias it into proper position, members 49 are urged by a spring 50 against the shaft 52, the adjustment of the same being by adjusting screws 54. This adjustment means is built into the housing 36.

The housing 10 is provided with a feed opening 56 aligned with the bite of the feed rolls 38, 40 and the juncture of the opening 56 and the bore 12 forms a cutting bar 58 against which the material to be severed is forced by the cutting portion 30 of the auger 14.

Figure 4:
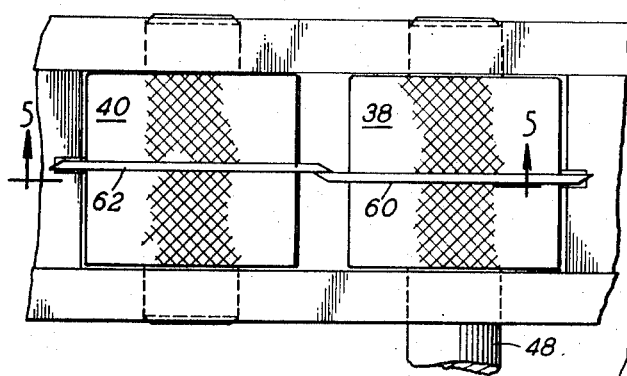
FIG. 4 is a partial top plan view showing another embodiment of the invention wherein circular knife blades cut the strip material into rope-like lengths.
Figure 5:
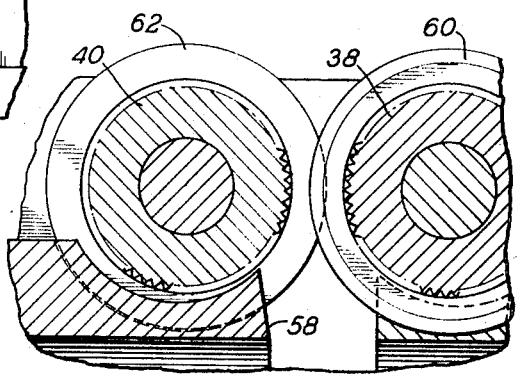
FIG. 5 is a partial sectional view taken on line 5—5 of FIG. 4.

In FIGS. 4 and 5, the feed rolls 38, 40 are provided with circular knives 60, 62 to subdivide the strip material laterally. The blades 60, 62 overlap one another, so as to be self-sharpening, and are of such size as to avoid contact with the adjacent roll. If necessary or desirable, additional blades may be provided if desired to further subdivide the material.

Figure 6:
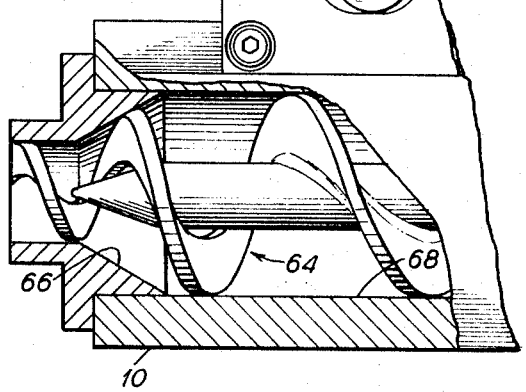
FIG. 6 is a partial sectional view of another embodiment of the auger and housing of FIG. 1 wherein the outlet is diminished in size and a screw continues for carrying the material to a working station.

FIG. 6 illustrates a modification of the here identified as auger 64 by reducing the size of the discharge portion 66 and contouring the bore 68 of the housing 10 accordingly. Here the flight of the auger is continued to convey the material to apparatus for ultimate use, such as an extruder or injection molding machine (not illustrated).

The speed of feed and the speed of the auger can be varied for the production of an ideal bulk density depending on use. For example the relationship of the speeds determines the size of the cut pieces. An increase in speed of the auger with the feed rolls remaining at a fixed speed, produces smaller cut pieces and a lower bulk density than a slower auger speed. An increase in speed of the feed roll with the auger rotating at a fixed speed produces larger cut pieces than a slower feed roll speed. Large cut pieces result in a higher bulk density than small cut pieces.

What is claimed is:

1. Apparatus for cutting strips or rope-like lengths of material into discrete pieces comprising:
   an elongated housing;
   a bore in said housing;
   rotating means in said bore closing one end of said bore;
   said rotating means having a cutting portion and a conveying portion;
   means for rotating said rotating means;
   an opening into said bore for feeding material thereinto;
   said opening being adjacent said cutting portion of said rotating means; and
   a fixed cutting edge formed at the juncture of said bore and said opening against which said cutting portion of said rotating means forces material to sever discrete lengths from the material fed thereto;
   said conveying portion of said rotating means conveying said discrete lengths to the open end of said bore for discharge therefrom.

2. Apparatus as recited in claim 1, wherein said rotating means comprises an auger, the cutting portion of which has a different pitch from said conveying portion.

3. Apparatus as recited in claim 1, further comprising means for feeding strip material into said opening and said bore.

4. Apparatus as recited in claim 3, further comprising means for cutting strip material into rope-like strips for feeding into said bore.

5. Apparatus as recited in claim 4 in which said feeding and cutting means comprises opposed knurled rolls having associated rotating, contacting circular knives.

6. Apparatus as recited in claim 5 wherein said knives overlap one another and each is faced from the opposite knurled roll.

* * * * *